(12) United States Patent
Wagner et al.

(10) Patent No.: US 12,379,089 B2
(45) Date of Patent: Aug. 5, 2025

(54) DIA AND AUTOMOTIVE DIA PROJECTION SYSTEM

(71) Applicant: Hella Saturnus Slovenija d.o.o., Ljubljana (SI)

(72) Inventors: Andrej Wagner, Ljubljana (SI); Janze Bebar, Celje (SI); Marusa Vek, Kamnik (SI); Marko Virsek, Grosuplje (SI); Matevz Smuc, Ljubljana (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 0 days.

(21) Appl. No.: 18/781,513

(22) Filed: Jul. 23, 2024

(65) Prior Publication Data

US 2024/0377044 A1 Nov. 14, 2024

Related U.S. Application Data

(63) Continuation of application No. PCT/EP2022/051937, filed on Jan. 27, 2022.

(51) Int. Cl.
*F21S 43/20* (2018.01)
*F21S 43/14* (2018.01)
*F21W 103/60* (2018.01)
*F21Y 115/10* (2016.01)

(52) U.S. Cl.
CPC .......... *F21S 43/2815* (2024.05); *F21S 43/14* (2018.01); *F21S 43/26231* (2024.05); *F21S 43/2817* (2024.05); *F21W 2103/60* (2018.01); *F21Y 2115/10* (2016.08)

(58) Field of Classification Search
CPC ............. F21S 43/2815; F21S 43/26231; F21S 43/2817; F21S 43/14
See application file for complete search history.

(56) References Cited

U.S. PATENT DOCUMENTS

| | | | | |
|---|---|---|---|---|
| 12,025,798 | B1* | 7/2024 | Dehkordi | G02B 27/0101 |
| 2003/0223102 | A1* | 12/2003 | Thor | G03H 1/0891 |
| | | | | 359/15 |
| 2011/0085241 | A1* | 4/2011 | Purchase | G02B 5/0278 |
| | | | | 359/599 |
| 2017/0050558 | A1* | 2/2017 | Salter | H05B 47/115 |
| 2019/0086787 | A1* | 3/2019 | Urey | G02B 27/0101 |
| 2019/0270403 | A1* | 9/2019 | Sobecki | G02B 3/0075 |

* cited by examiner

*Primary Examiner* — Christopher E Dunay
(74) *Attorney, Agent, or Firm* — Husch Blackwell LLP

(57) ABSTRACT

A dia for an automotive dia projection system has a transparent substrate with an opaque coating in portions thereof, thereby forming a binary pattern for projection. The pattern features a dither noise microstructure, such that an associated image is projectable giving the perception of a greyscale image to the human viewer.

10 Claims, 4 Drawing Sheets

DIA AND AUTOMOTIVE DIA PROJECTION SYSTEM

CROSS REFERENCE

This application claims priority to and is a continuation of PCT Application No. PCT/EP2022/051937, filed Jan. 27, 2022, the entirety of which is hereby incorporated by reference.

FIELD OF THE INVENTION

The present invention relates to a dia for an automotive dia projection system featuring a transparent substrate with an opaque coating in portions thereof, thereby forming a binary pattern for projection. The invention furthermore relates to a corresponding dia projection system.

BACKGROUND OF THE INVENTION

Dia projection systems are increasingly finding applications in the automotive sector, where they are used in particular to project images as symbols or signals onto the road. For this purpose, the automotive dia projection systems are integrated into the periphery of motor vehicles, for example into the underside of the exterior mirrors, the rocker panel, the front end or the back end. The projected images, for example the logo of the manufacturer of the motor vehicle, typically serve entertainment purposes, although a signal function for other road users can also be realised, for example arrows projected onto the road to announce a turning manoeuvre.

Automotive dia projection systems comprise at least a dia, a backlight and projection optics. The dia comprises a transparent substrate which is partially covered by a light-absorbing coating or film, thereby forming a pattern whose image is intended for projection.

In the prior art, it is known to provide a structured metal coating on the substrate, forming a strictly binary pattern of transparent and opaque sections. The corresponding image projected onto the road creates a corresponding binary image contrast for the human viewer, reminiscent of a black and white image. For the projection of more complex images in greyscale representation, for example to create a three-dimensional image impression, it is known in the prior art to provide photographic films instead of a metal coating on the substrate of the dia. By means of photographic films, the degree of transmission can be varied essentially continuously, so that more complex patterns can be created. However, photographic films are only suitable to a very limited extent for use in automotive applications, as they are subject to rapid wear under the typical conditions of use, in particular due to moisture and heat.

BRIEF SUMMARY OF THE INVENTION

It is an object of the present invention to propose an alternative embodiment of a dia for an automotive dia projection system, which allows for an effective greyscale image projection.

The invention relates to a dia comprising a transparent substrate with an opaque coating in portions thereof, thereby forming a binary pattern for projection, and discloses the technical teaching that the pattern features a dither noise microstructure, such that an associated image is projectable giving the perception of a greyscale image to the human viewer.

The invention is based on the idea of creating the illusion of a greater greyscale depth by replicating the missing greyscale levels through certain pixel arrangements in the pattern from the two values available on the dia (black and white), thereby avoiding sharp transitions between black and white in the projected image. The intended greyscale level is converted to a respective density of black pixels. The human eye perceives the dither noise microstructure of the pattern as a mixture of black and white in the projected image, i.e., performs a spatial integration, so that the desired impression of an image with greater greyscale depth is created. If the image of the pattern on the dia is not projected with a white light source, but with coloured light, the term "greyscale" used here is to be understood analogously.

In order to achieve the desired dithering effect for the human viewer, the characteristic structure sizes of the dither noise microstructure must be adapted to the magnification of the projection optics of the associated dia projection system as well as the intended distance to the projection surface, i.e. typically to the road surface, for each specific application.

Dithering refers to the process of adding an intentionally applied form of noise to an image. Exemplarily, the dither noise microstructure of the pattern on the dia according to the invention is based on halftone dithering or random dithering.

Halftone dithering simulates continuous-tone greyscale gradient through the use of dots, varying in size, spacing and number density, thus generating a gradient-like effect.

In random dithering the grayscale image to be mapped into a binary image is compared pixel by pixel with a grayscale noise image representing uniform noise. If the grayscale level of the pixel is higher than the level of the pixel in the noise image, the output pixel is white, otherwise it is black.

In particular, the minimal structure size within the dither noise microstructure of the pattern on the dia according to the invention measures at least 1 micrometre. This structure size corresponds to the maximum resolution achievable in typical photolithographic microstructuring processes. For instance, the minimal structure size within the dither noise microstructure measures 1 micrometre to 20 micrometre. In combination with the magnifications commonly used in automotive dia projection systems and the typical distance to the road surface as projection surface, these minimal structure sizes are suitable to achieve the desired grayscale image perception for the human viewer. If the related dia projection system features a particularly small angular magnification, it may be necessary to extend the minimal structure size beyond the aforementioned limit.

In a preferred embodiment of the dia, the coating is provided as a low-reflective coating, especially as a chromium-based coating, e.g., a pure chromium coating or a chromium compound such as chromium oxide or chromium nitride. Such chromium-based coatings feature a very low reflectivity in the visible light spectrum, e.g., below 5%. Low reflectivity of the dia reduces the reflection of light reflected from the projection optics inside the related dia projection system and consequently reduces the presence of stray light.

Preferably, the substrate of the dia is provided from a silicate glass or an optical polymer, e.g., polycarbonate (PC) or poly methyl methacrylate (PMMA).

The invention furthermore relates to an automotive dia projection system at least comprising: a dia according to one of the aforementioned embodiments, an illumination module for backlighting the dia, and a projection optic for projection of an image of the dia.

In particular, the projection optic features an angular magnification of 1 to 500, especially 10 to 100. The typical distance between the projection optic and the projection surface, typically the road surface, measures in the order of 10 centimetres to 1 metre and the angular magnification must be chosen appropriately.

In a preferred embodiment of the dia projection system, the illumination module comprises an LED-based illuminant and an associated condenser optic.

The invention furthermore discloses the use of an automotive dia projection system according to one of the aforementioned embodiments for the projection of images for signalling or entertainment purposes, wherein the dia projection system is configured to be integrated into the exterior mirror, the rocker panel, the front end, the back end or the interior of a motor vehicle. For communication with other road users, various signals can be projected onto the road surface to indicate upcoming driving manoeuvres, such as turning, braking or reversing. Images for entertainment purposes are, e.g., welcome light scenarios in which manufacturers' logos or other symbols are projected onto the road to the side of the vehicle when the door locks are operated or when the vehicle doors are opened.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
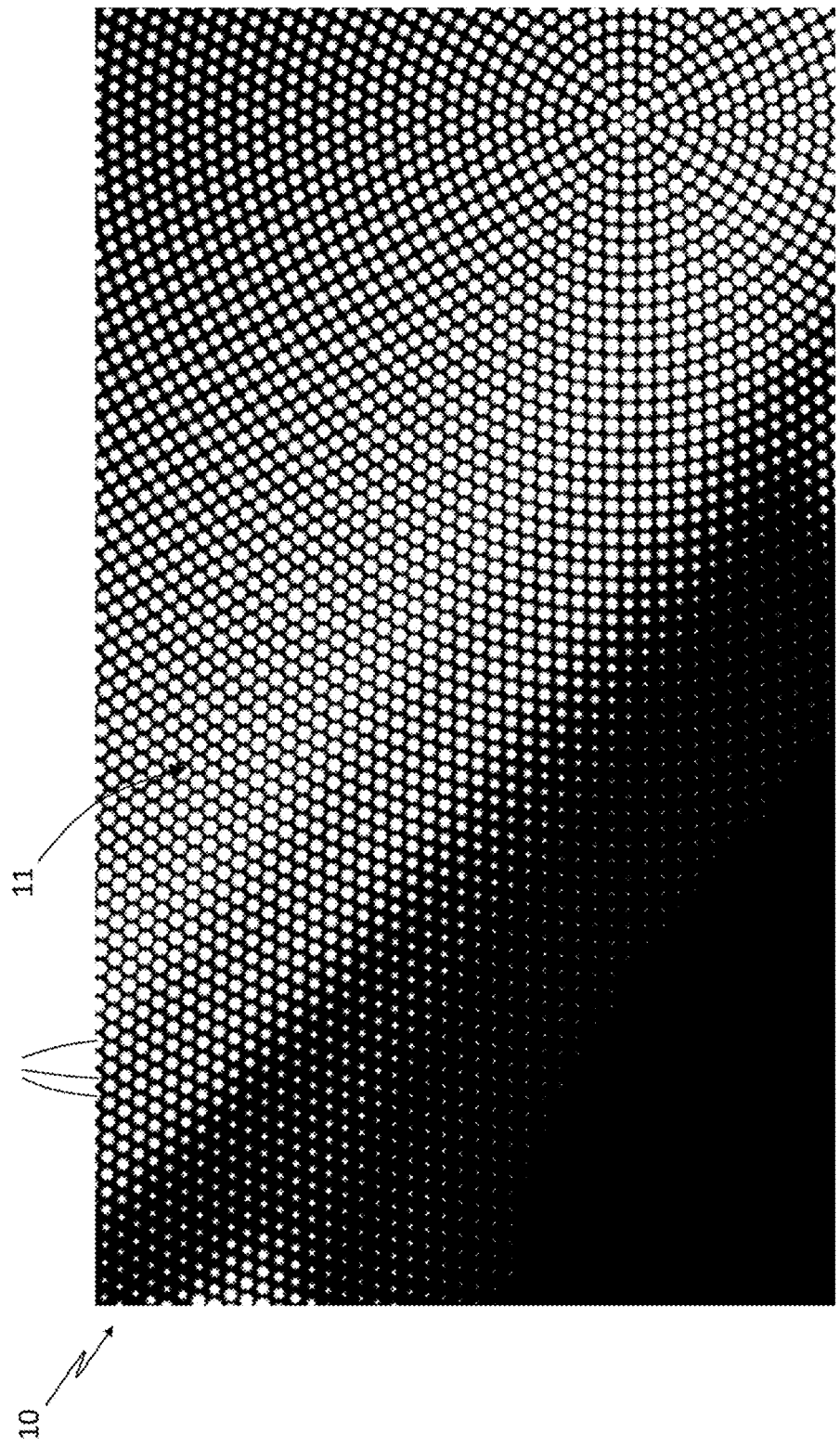
FIG. 1 is a section of a first embodiment of a pattern with dither noise microstructure.
Figure 2:
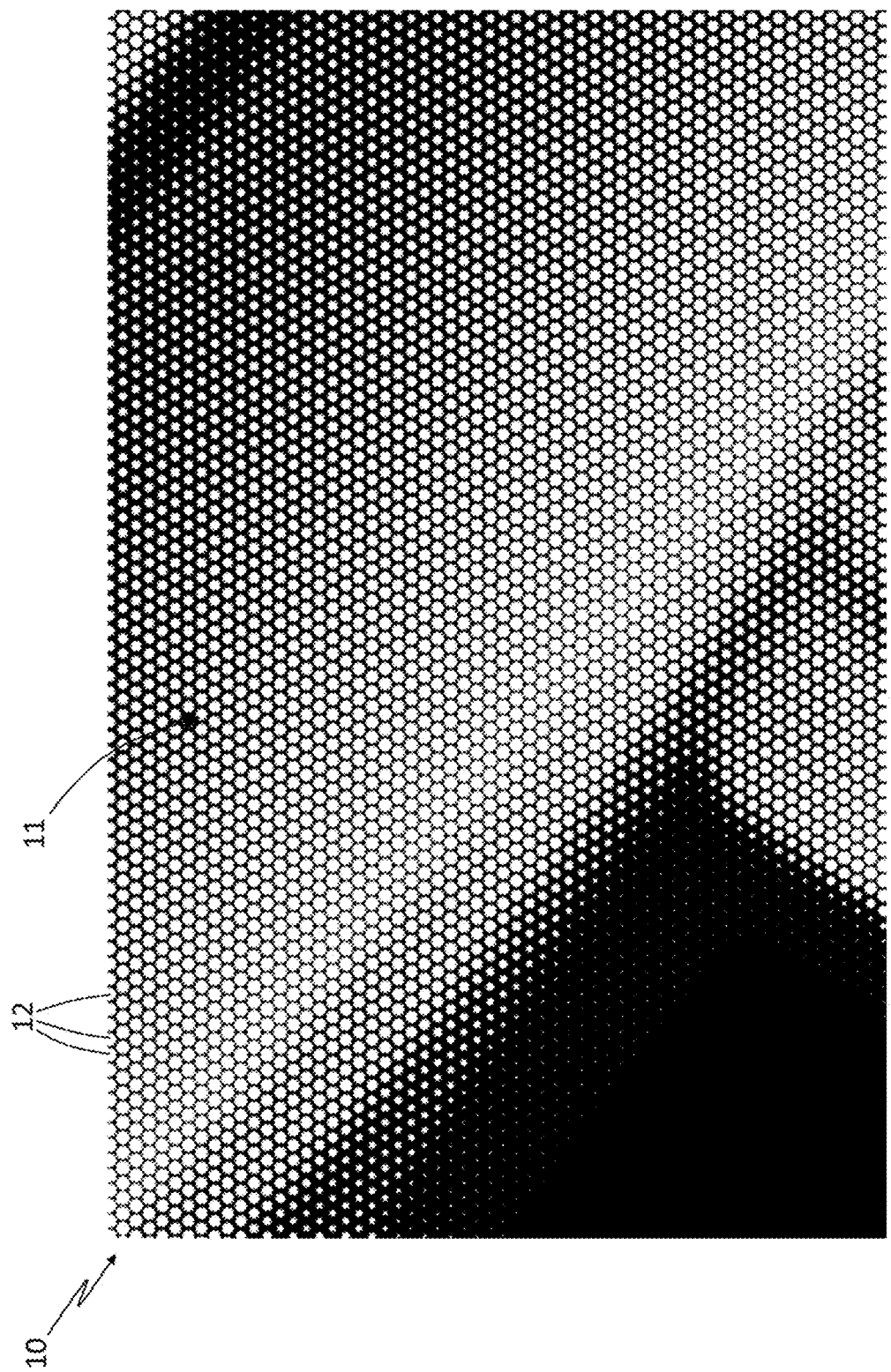
FIG. 2 is a section of a second embodiment of a pattern with dither noise microstructure.
Figure 3:
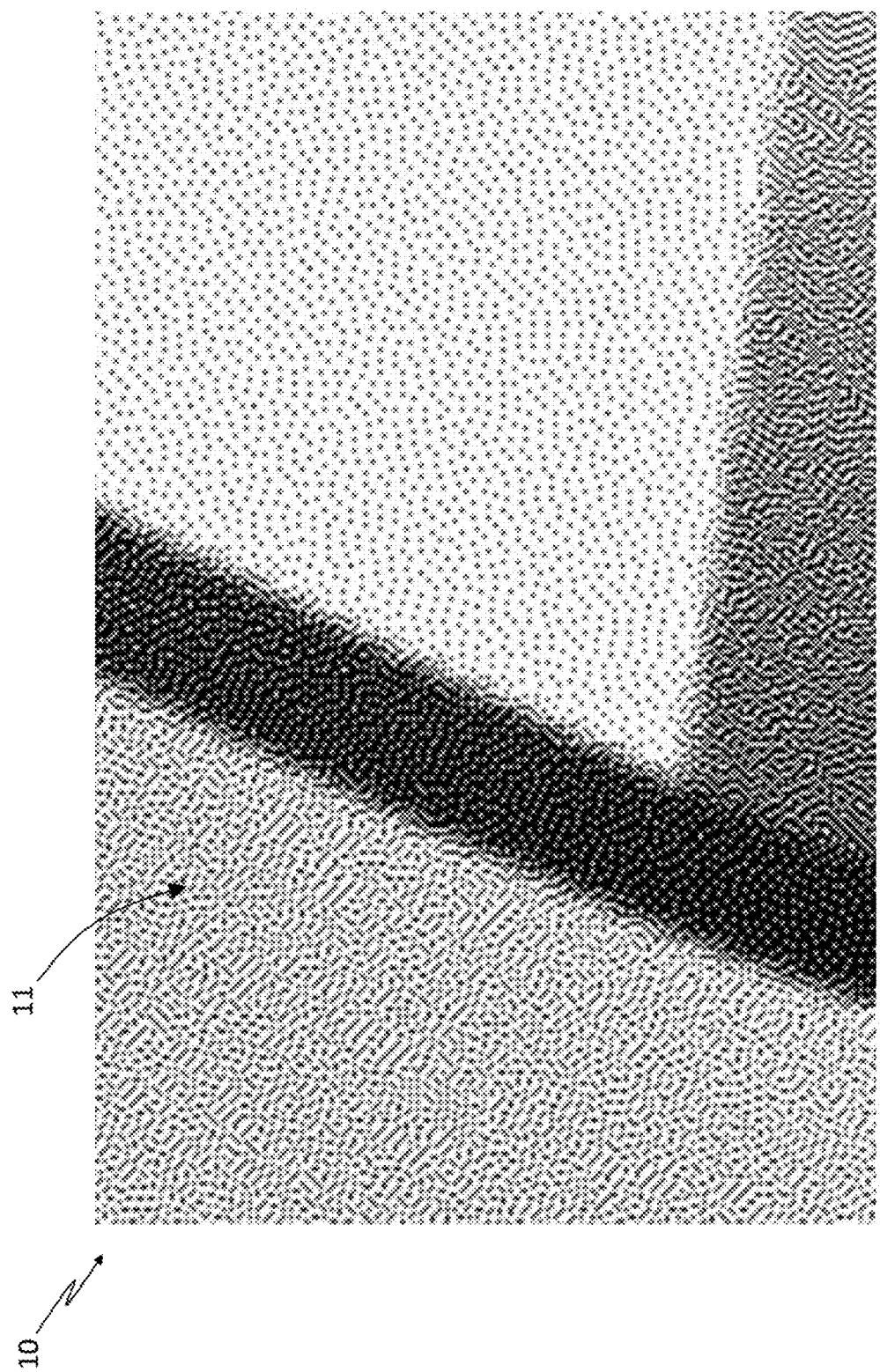
FIG. 3 is a section of a third embodiment of a pattern with dither noise microstructure.

FIGS. 1-3 show sections of various embodiments of pattern 10 with dither noise microstructures 11 as elements of dias according to the invention. The pattern 10 are binary black/white pattern, wherein black pixels correspond to sections with opaque coating and white pixels correspond to uncoated sections of the transparent substrate.

FIGS. 1-2 show pattern 10 with dither noise microstructures 11 generated by halftone dithering. The pattern 10 feature transparent (white) dots of locally varying size, spacing and number density in order to generate the desired grayscale depth in a corresponding projected image. Exemplarily, the dots are arranged in a concentric grid (FIG. 1) or a hexagonal grid (FIG. 2).

FIG. 3 shows a pattern 10 with dither noise microstructure 11 generated by random dithering and exhibits a grainy, erratic appearance typical for this dithering algorithm.

Figure 4A:
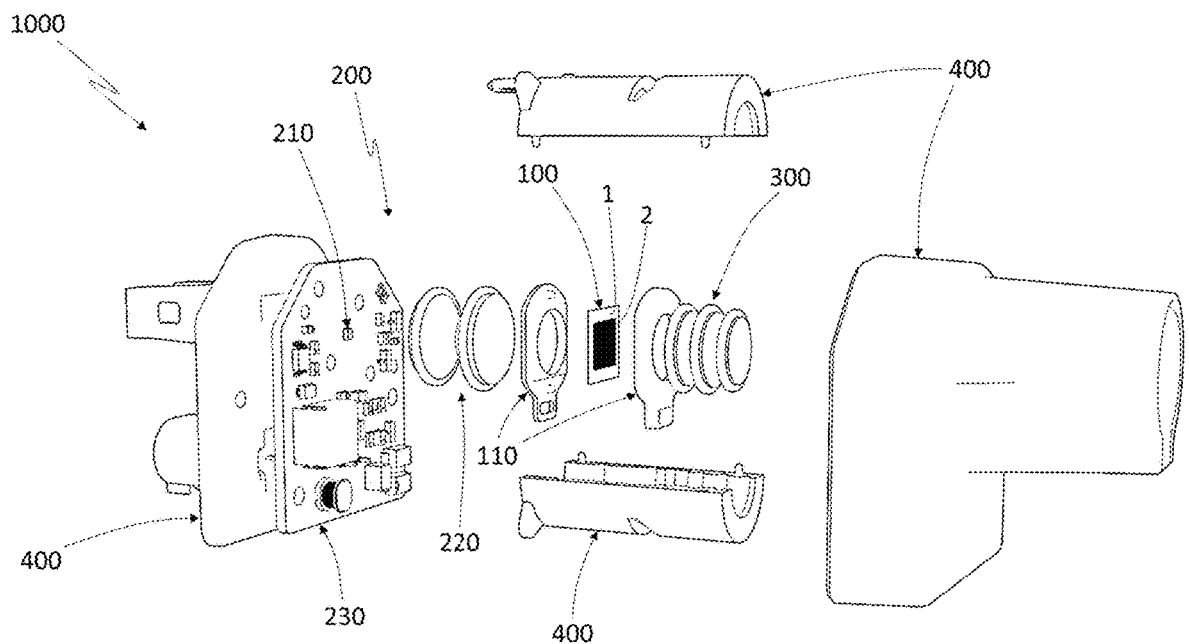
FIGS. 4a and 4b are exploded views of an automotive dia projection system.
Figure 4B:
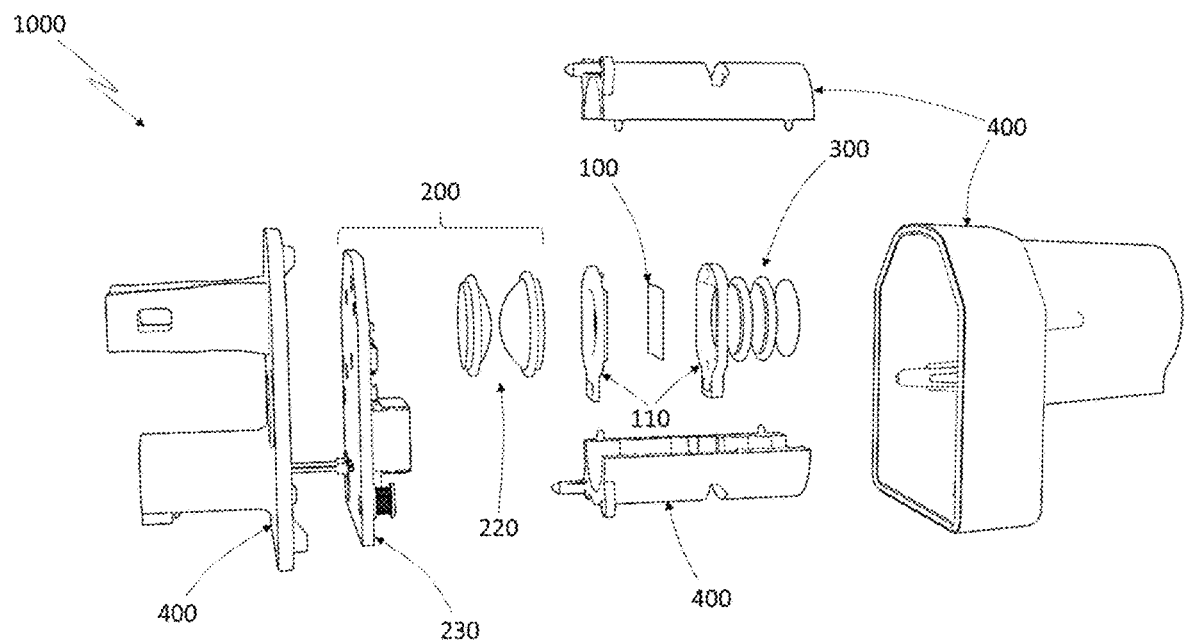

FIGS. 4a-4b show exploded view of an automotive dia projection system 1000 according to the invention comprising the dia 100, the illumination module 200, the projection optic 300 and the housing 400.

The dia 100 comprises the transparent substrate 1 with the opaque coating 2 in portions thereof, whereby the binary pattern for projection is not shown in the Figures. The dia 100 is received by the dia holder 110.

The illumination module 200 comprises the light-emitting diode (LED) based illuminant 210 on the printed-circuit board (PCB) 230 and the condenser optic 220 adjusted for backlighting of the dia 100.

The projection optic 300 preferably features a magnification of 10× to 100× for the intended use in automotive applications.

The automotive dia projection system 1000 is configured to be integrated in an exterior mirror of a motor vehicle, in such a way that the projection optic 300 points vertically downwards as to project an image of the pattern on the dia 100 to the road surface next to the motor vehicle.

The present invention is not limited by the embodiments described above, which are represented as examples only and can be modified in various ways within the scope of protection defined by the appending patent claims.

| List of Numerals | |
|---|---|
| 1000 | Dia projection system |
| 100 | dia |
| 1 | substrate |
| 10 | pattern |
| 11 | dither noise microstructure |
| 2 | coating |
| 110 | dia holder |
| 200 | illumination module |
| 210 | illuminant |
| 220 | condenser optic |
| 230 | PCB |
| 300 | projection optic |
| 400 | housing |

We claim:

1. A dia for an automotive dia projection system, the dia comprising:
   a transparent substrate with an opaque coating in portions thereof, thereby forming a binary pattern for projection, wherein the pattern has a dither noise microstructure, such that an associated image is projectable giving the perception of a greyscale image to a human viewer, and wherein the coating is a low-reflective coating.

2. The dia according to claim 1, wherein the dither noise microstructure is based on halftone dithering or random dithering.

3. The dia according to claim 1, wherein a minimal structure size within the dither noise microstructure measures at least 1 micrometre.

4. The dia according to claim 1, wherein the substrate is provided from a silicate glass or an optical polymer.

5. An automotive dia projection system comprising:
   a dia according to claim 1;
   an illumination module for backlighting the dia; and
   a projection optic for projection of an image of the dia.

6. The dia projection system according to claim 5, wherein the projection optic includes an angular magnification of 1 to 500.

7. The dia projection system according to claim 6, wherein the projection optic includes an angular magnification of 10 to 100.

8. The dia projection system according to claim 5, wherein the illumination module comprises an LED-based illuminant and an associated condenser optic.

9. A motor vehicle comprising:
   the dia projection system of claim 6 for the projection of images for signalling or entertainment purposes, wherein the dia projection system is integrated into an exterior mirror, a rocker panel, a front end, a back end or an interior of a motor vehicle.

10. The dia according to claim 1, wherein the coating is a chromium-based coating.

* * * * *